United States Patent
Rhodes et al.

[11] Patent Number: 5,901,443
[45] Date of Patent: *May 11, 1999

[54] METHOD OF MAKING A MANIFOLD FOR AN AUTOMOTIVE HEAT EXCHANGER

[75] Inventors: Eugene E. Rhodes, Belleville; Wen Fei Yu, West Bloomfield, both of Mich.

[73] Assignee: Ford Motor Company, Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/625,655

[22] Filed: Mar. 29, 1996

[51] Int. Cl.$^6$ ..................................................... B23P 15/26
[52] U.S. Cl. ................. 29/890.044; 29/890.054; 29/890.08
[58] Field of Search ........................ 29/890.03, 890.043, 29/890.044, 890.053, 890.054, 890.08; 228/183; 72/356, 369

[56] References Cited

U.S. PATENT DOCUMENTS

| | | |
|---|---|---|
| 3,618,844 | 11/1971 | Morley et al. . |
| 3,802,239 | 4/1974 | Karmann et al. . |
| 3,870,218 | 3/1975 | Ehle . |
| 4,558,695 | 12/1985 | Kumazawa et al. . |
| 4,945,635 | 8/1990 | Nobusue et al. . |
| 5,243,842 | 9/1993 | Kobayashi et al. . |
| 5,471,857 | 12/1995 | Dickerson .................................. 72/57 |
| 5,642,640 | 7/1997 | Insalaco et al. ...................... 29/890.08 |

*Primary Examiner*—I. Cuda
*Attorney, Agent, or Firm*—Raymond L. Coppiellie

[57] ABSTRACT

There is disclosed herein a method for forming a manifold for a heat exchanger. The method includes the steps of the forming a generally planar sheet of material into a generally cylindrical member having a seam along the longitudinal length thereof. The method further includes forming a plurality of tube receiving slots in the cylindrical member and applying a pressure against the seam so as to flatten the seam.

7 Claims, 4 Drawing Sheets

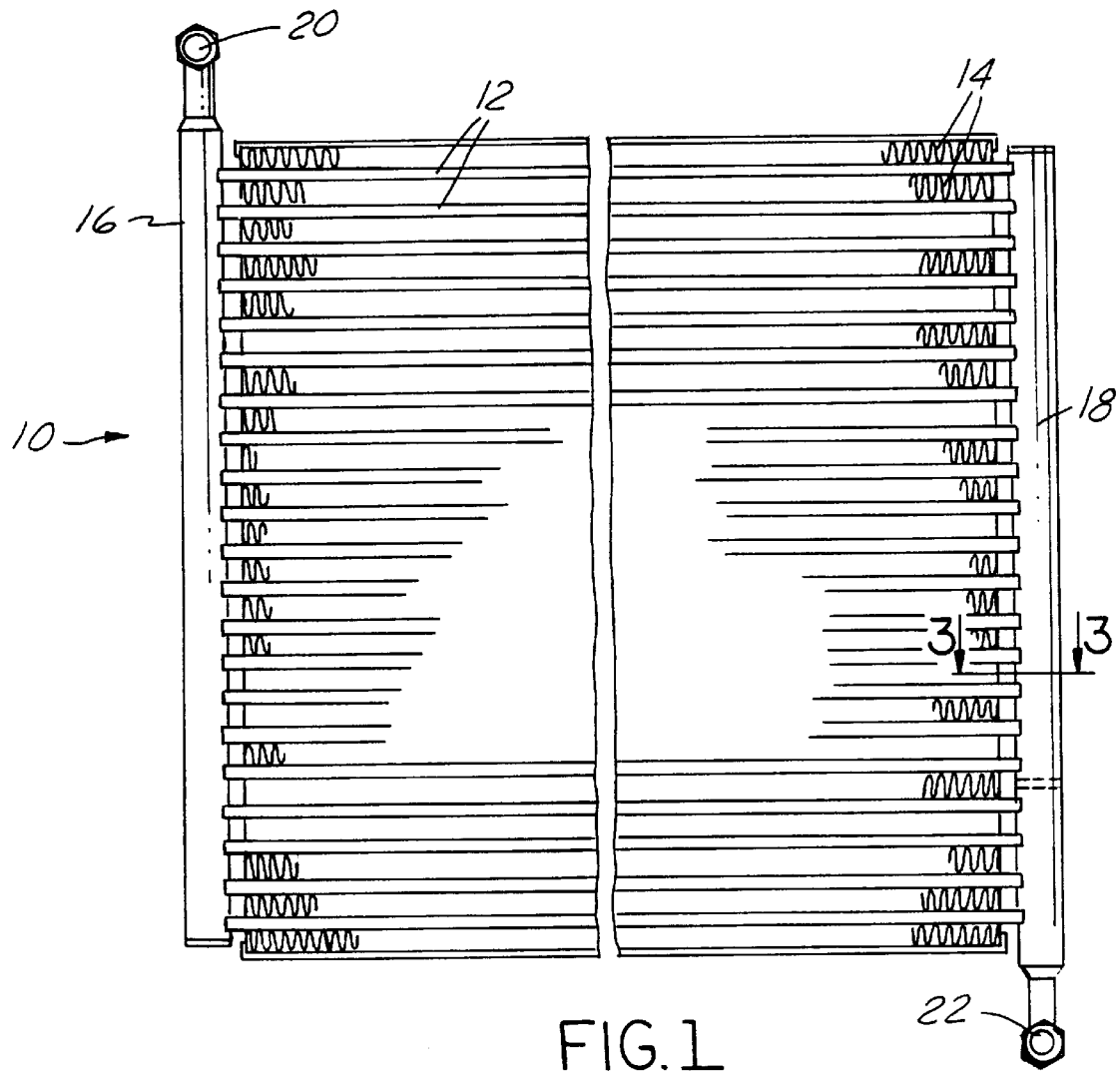
FIG. 1
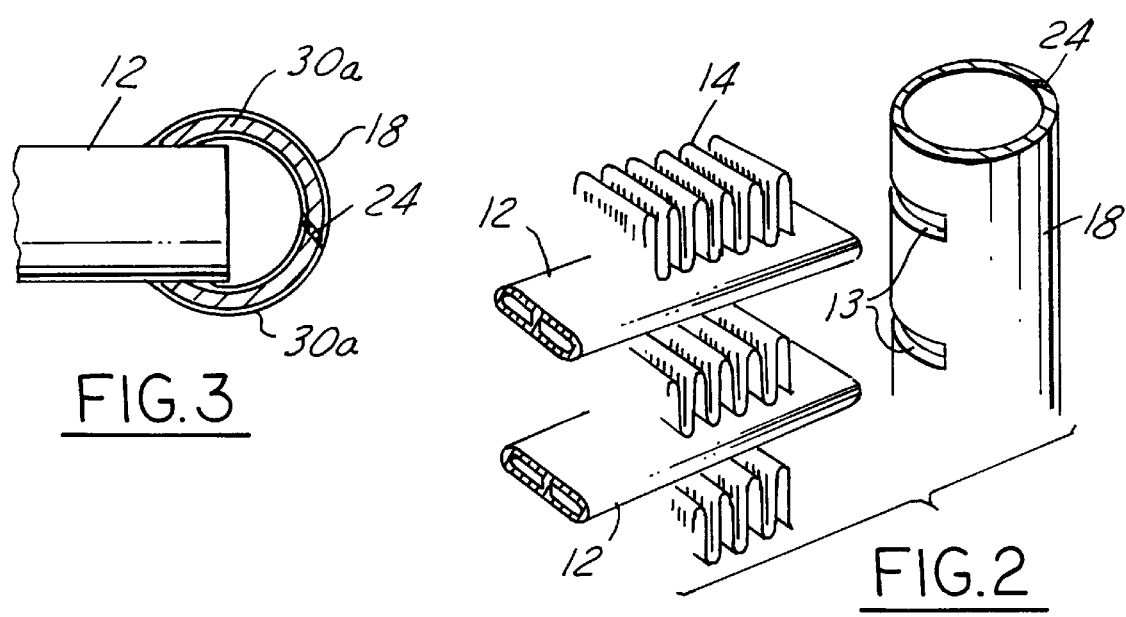
FIG. 3
FIG. 2

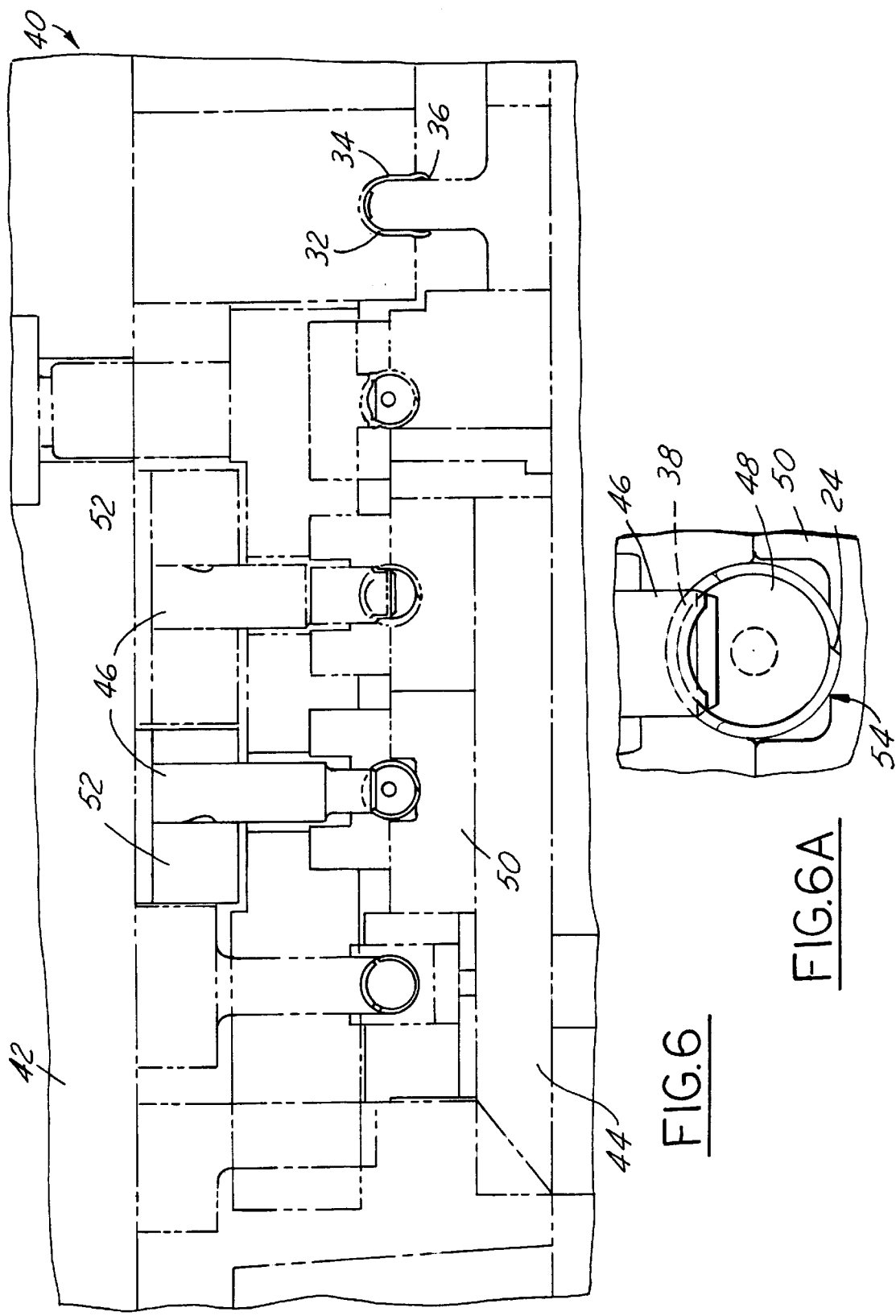

METHOD OF MAKING A MANIFOLD FOR AN AUTOMOTIVE HEAT EXCHANGER

BACKGROUND OF THE INVENTION

1. Field of the Invention

The present invention relates generally to heat exchangers for automotive vehicles. More particularly, the present invention relates to a method of manufacturing a manifold for an automotive heat exchanger.

2. Disclosure Information

A heat exchanger includes cylindrical manifolds (or headers) which introduce a cooling medium into the heat exchanger tubes and discharge it after it has circulated throughout the heat exchanger. Typically, the cylindrical manifolds are made by rolling a brazing sheet into a cylinder. The brazing sheet is made of a core sheet coated with a brazing substance on one or both surfaces. The manifold, the tubes and other components, such as fins, are brazed to one another by vacuum brazing or with the use of a brazing flux.

One method of making manifolds for heat exchangers includes the step of rolling the brazing sheet until both of its ends are abutted. The abutted ends are electronically welded to form a seamed pipe. A specific number of holes or slots are formed in the manifold for insertion of the tubes thereinto.

To make the holes, a punching pressure has been applied to the manifold, but under the pressure the manifolds are in danger of crushing or deforming because of the relatively weak welded seams. To avoid such problems, the holes or slots were made by a milling. The milling unavoidably produced flashes, so that the tramming of flash was required. This is a time- and a labor-consuming work. In order to keep the manifolds tough, the holes must be off the welded seam. This requires determining whether the spot to be punched for the hole is off the welded seam.

One method which overcame the problems associated with this process is disclosed in U.S. Pat. No. 4,945,635. The '635 patent teaches a method of making a header pipe (manifold) which includes the steps of preparing a core brazing sheet with a brazing substance on at least one surface. The method further includes forming a bulged portion of a semi-circular cross-section in the central section of the brazing sheet, providing apertures in the bulged portion for insertion of the ends of the tubes, and rolling the brazing sheet into a cylinder with its opposite ends being butt joined to each other. The process of the '635 patent has the benefit that by forming the apertures in the bulged portion, the header pipe is not crushed during the assembly process. However, the process requires that after the apertures are formed in the bulge portion, the brazing sheet is rolled into a cylinder with its opposite ends being butt joined to each other. It has been found that this rolling process often does not create a good overlapped butt joint between the ends of the cylinder, resulting in a gap between the ends and leakage of the header pipe.

Therefore, it would be advantageous to provide a process for making a manifold for a heat exchanger which overcomes the disadvantages associated with the prior art and which provides a leak-free seam therein.

Accordingly, it is an object of the present invention to provide a process for producing a heat exchanger manifold which produces a leak-free seam along the length of the manifold and which prevents crush or deformation during the aperture forming process.

SUMMARY OF THE INVENTION

The present invention overcomes the disadvantages of the prior art by providing a method of making a manifold for an automotive heat exchanger, the method comprising the steps of: providing a generally planar sheet of deformable material, forming the planar sheet of material into an elongate, generally cylindrical member having a seam along the longitudinal length thereof, forming a plurality of tube receiving slots in the generally cylindrical member, and applying pressure perpendicularly against the seam so as to flatten the seam, thereby providing a good butt joint between the ends of the cylindrical member. The cylindrical member is then welded or brazed at a predetermined temperature for a predetermined time for forming a heat exchanger manifold.

It is an advantage of the present invention that a heat exchanger manifold will be produced which has a good overlapped butt joint between the ends of the seam to produce a leak free manifold.

BRIEF DESCRIPTION OF THE DRAWINGS

FIG. 1 is a perspective view of a heat exchanger for use in an automotive vehicle having manifolds manufactured according to the present invention.

FIG. 2 is an exploded view of a portion of the heat exchanger of FIG. 1.

FIG. 3 is a cross-sectional view of the portion of the heat exchanger of FIG. 1 taken along line 3—3 thereof.

FIG. 6 is a partial view of an apparatus for manufacturing of a manifold according to the present invention.

FIG. 6A is an enlarged view of a portion of FIG. 6.

DETAILED DESCRIPTION OF THE PREFERRED EMBODIMENTS

Figures 4A, 4B, 4C, 4D:
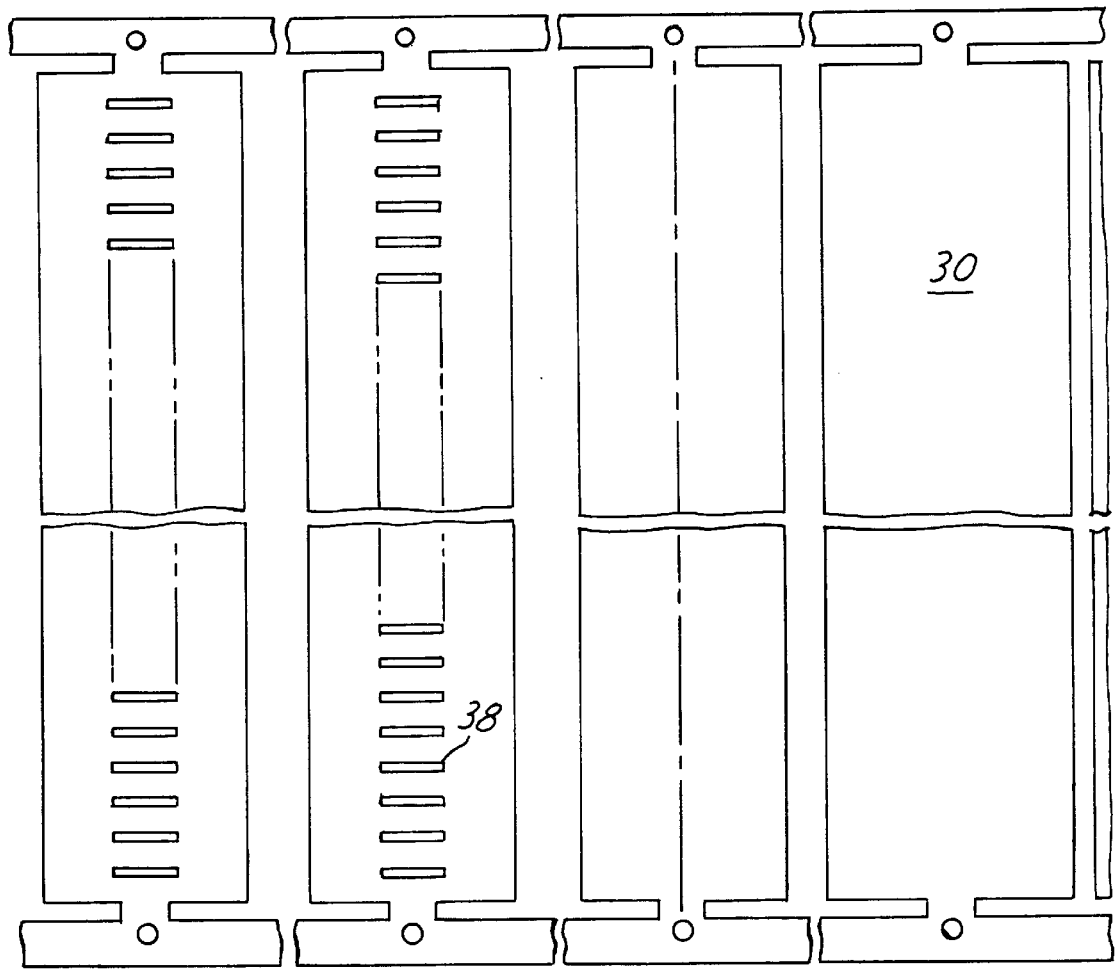
FIGS. 4A through H are plan views of the manufacturing steps of the process according to the present invention.

Referring now to the drawings, FIGS. 1–3 show a heat exchanger for an automotive vehicle structured in accordance with the principles of the present invention. The heat exchanger 10, such as a condenser or radiator or the like, includes a plurality of fluid carrying tubes 12, a plurality of corrugated fins 14 interleaved between the tubes and a pair of manifolds 16, 18 disposed at opposite ends of the tubes. As used throughout this specification, the terms "manifold" and "header" will be used interchangeably. As shown in FIG. 1, the heat exchanger 10 is a condenser of the parallel flow type including a plurality of extruded tubes having multiple fluid pathways with hydraulic diameters of up to 0.070 inches. The tubes can be extruded from an aluminum material or can be formed by inserting an undulating member into a hollow tube to form the plurality of fluid pathways as is well-known in the art.

Each of the manifolds 16, 18 includes a plurality of tube receiving slots 13 for receiving the tubes 12 therein during the assembly process. The manifolds further include an inlet 20 and an outlet 22, respectively, as is also known in the art. Each of the manifolds 16, 18 is formed according to the method of the present invention and includes a weld seam 24 extending along the longitudinal length thereof. It should be apparent to those skilled in the art that the manifolds of the present invention can be utilized on other heat exchangers as well.

The manifolds 16, 18 of the present invention are manufactured according to the process steps as shown in FIGS. 4A–H and 5A–H. It should be apparent to those skilled in the art that FIGS. 4A–H and 5(A–H) show the various stages of manufacturing a manifold according to the present invention in a progressive die. Further details of the progressive die will be described below. Referring now to those figures, FIGS. 4A and 5A show that the first step in manufacturing a manifold according to the present invention is to provide a generally planar sheet of deformable material 30.

The generally planar sheet 30 may be coated on one or both sides with a brazing substance to form layer 30a. The deformable sheet 30 is typically formed from an aluminum alloy and the brazing material is an aluminum silicon alloy commonly known to those in the brazing art. The next step in forming the manifold 16, 18 is to form the planar sheet 30 into an arcuate portion 32 having a pair of flanges 34 extending therefrom such as shown in FIG. 5B. The arcuate portion 32, or bulged portion, is centrally defined and flanges 34 extend from the edges thereof. It is important to note that at this stage that the ends 36 of the flanges 34 are slightly angled to increase the surface contact of the weld seam as will be described below.

Figures 5A, 5B, 5C, 5D:
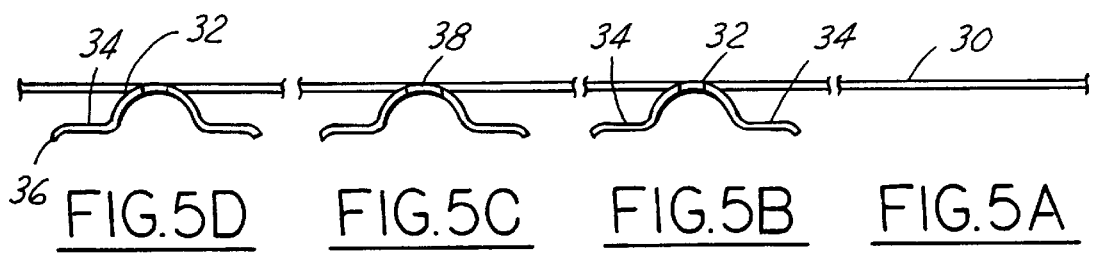
FIGS. 5A through H are cross-sectional views taken along line 5—5 of FIG. 4.

After the arcuate portion is formed, the next stage in manufacturing the manifold is shown in FIGS. 4C and 5C wherein a plurality of tube receiving slots 38 are stamped in the arcuate portion 32. After the tube receiving slots are formed, the ends 36 of the flanges 34 extending from the arcuate portion 32 are rolled in a downward fashion such as shown in FIG. 5E.

Figures 4E, 4F, 4G, 4H:
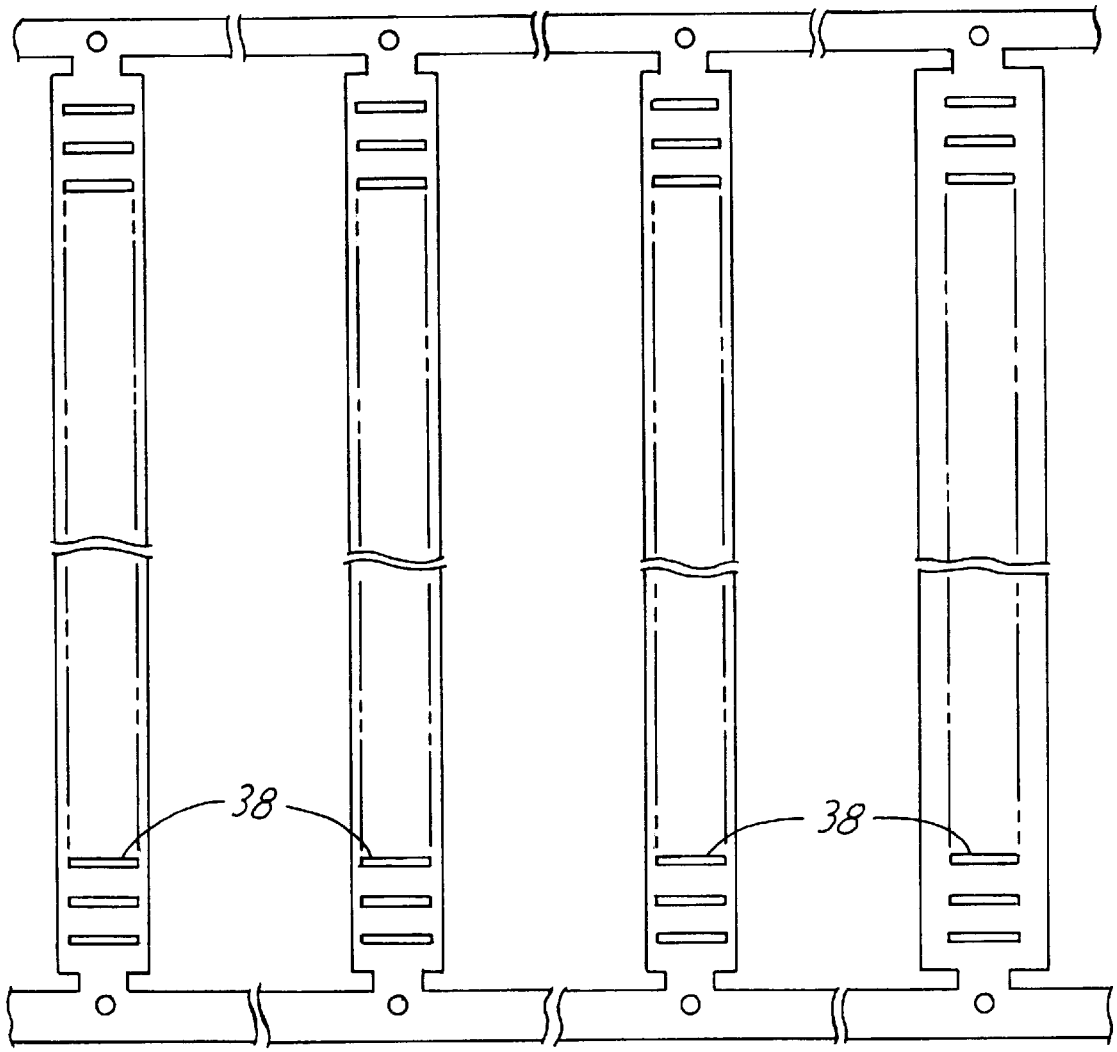

FIGS. 4E, F and 5E, F show the next steps in the manufacture process wherein the flanges 34 are straightened so as to form a generally U-shaped elongated member. Next, the U-shaped member is rolled into a cylinder in which the slanted ends 36 are abutted complimentarily to the thickness of the brazing such as shown in FIG. 5G. The process steps explained with reference to FIGS. 4A–G and 5A–G are essentially those described in U.S. Pat. No. 4,945,635,the disclosure of which is herein incorporated by reference. The method of manufacturing a manifold according to the present invention represents an improvement to the '635 patent and such is shown in FIGS. 4H and 5H. In the manufacture steps shown in FIGS. 4H and 5H, the weld seam 24 is flattened by applying a pressure perpendicularly against the weld seam 24. By applying this pressure, the weld seam is "ironed out" and flattened so that the slanted ends 36 are forced into a better abutting relationship than what was taught in the '635 patent. As will be described below, this pressure is applied by inserting an arbor into the diameter of the manifold at the stage 5H of the progressive die and forcing the punches which created the tube receiving slots 38 through the slots 38 against the arbor to apply the pressure against the seam. As such, the seam 24 is ironed and the slanted ends 36 are forced into better contact with one another and any gaps existing therebetween are eliminated.

Figures 5E, 5F, 5G, 5H:
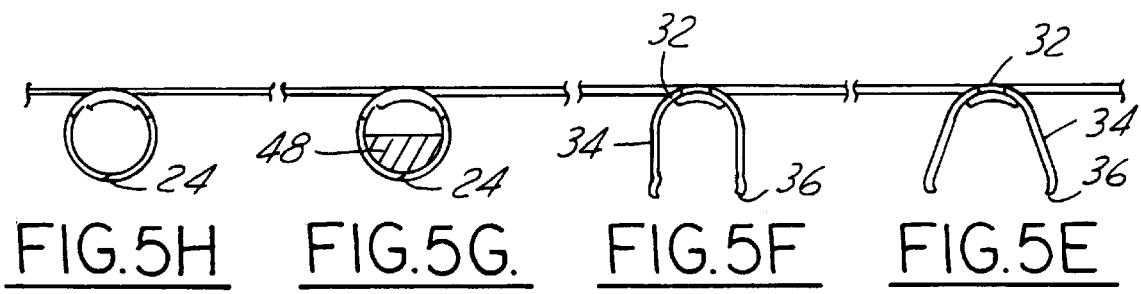

Once the manifold has been completed at the manufacture stage shown in FIG. 5H, the rest of the heat exchanger is assembled in known manner, that is, the tubes and fins are interleaved and inserted into the headers and the whole assembly is brazed in a furnace as is well-known in the art. As such, a heat exchanger according to the present invention is manufactured.

FIGS. 6 and 6A illustrate an apparatus for manufacturing a manifold according to the present invention. FIG. 6 shows a cross-sectional view of a progressive die used to manufacture the manifold beginning at about stage F, as shown in FIGS. 4F and 5F as described previously. At stage F, the flange portions 34 are straightened so as to form the generally U-shaped member shown at stage F in FIG. 6. In the succeeding stages, the U-shaped member is rolled into a cylindrical member by the action of the progressive die 40.

The progressive die 40 includes an upper platen 42 and a lower platen 44 and has a series of stages indicated by the letters F through H therein. The die 40 further includes a punch member 46 and a retractable arbor 48. As shown in FIG. 6A, the manifold 16 is seated in a lower die block 50 connected to the lower platen 44 of the die 40. The punch 46 is seated within and connected to an upper die block 52 so that movement of the upper die block in a vertically reciprocating motion causes the punch 46 to contact the arcuate portion of the manifold to create the tube receiving slots as described above. Once the slots 38 have been created, the manifold is rolled into the cylinder such as shown at stage G in the progressive die 40.

To ensure a completed butt joining of the slanted ends 36 of the cylindrical member as contemplated by the present invention, the manifold proceeds next to stage H wherein the manifold is seated into the lower die block 52 in a die seat 54 and arbor 48 is inserted through the manifold 16. The punch 46 is then activated by the reciprocatory motion of the upper die block such that the punch then enters through the previously formed tube receiving slots 38 to contact arbor 48 and apply a downward pressure vertically against the seam 24 seated in the die seat of the lower die block. Alternatively, an additional punch could be used in place of the same punch used to form the tube receiving slots. As such, this downward pressure perpendicularly against the seam 24 causes the seam to flatten and forcing the slanted ends 36 together in a more secure overlapped, butt joint than what was previously known. After the pressure has been applied by the punch, the punch and arbor are removed and the manifold proceeds through the remaining stages of fabrication until it is withdrawn and assembled into a heat exchanger according to the present invention. As such, the progressive die comprises the means for forming the planar sheet of material 30 into the elongated generally cylindrical member having the seam 24 along its longitudinal length. The punches 46 provide means for providing the plurality of tube receiving slots and the means for applying pressure perpendicularly against the seam to flatten the seam is provided by the reciprocatory motion of the punch 46 against arbor 48 while the manifold is seated in the die seat of the lower die block as shown in FIG. 6A.

Various other modifications will no doubt become apparent to those skilled in the art. It is the following claims, including all equivalents which define the scope of the invention.

What is claimed is:

1. A method of making an automotive heat exchanger, comprising the steps of:
    providing a plurality of generally elongate, flat tubes having a plurality of fluid pathways therein;
    providing a plurality of serpentine fin members;
    providing a pair of fluid manifolds each one of the pair of manifolds being formed by the steps of:
        providing a generally planar sheet of deformable material;
        bending the sheet of material into an elongate, generally U-shaped member having an arcuate portion and a pair of flanges extending from the arcuate portion along the longitudinal length thereof, each of the flanges including a longitudinal terminal edge;
        forming a plurality of tube receiving slots in the arcuate portion of said U-shaped member by forcing a punch through one side of said member;
        bending the longitudinal terminal edges of the flanges toward each other to form a generally cylindrical member having a seam extending the longitudinal length of the member;

inserting the member into a die and placing an arbor into the generally cylindrical member so that it contacts said seam along the longitudinal length thereof;

striking said arbor with said punch through said tube receiving slots and applying a pressure against the arbor into the seam and against the die so as to force the longitudinal terminal edges toward each other;

removing said arbor from said cylindrical member;

placing the plurality of tubes into opposing tube receiving slots in opposed manifolds;

interleaving the plurality of fin members between the plurality of tube members to form a heat exchanger core; and brazing the heat exchanger core at a predetermined temperature for a predetermined time.

2. A method according to claim 1, wherein the tubes are placed in opposed slots in the manifolds in a generally parallel arrangement.

3. A method of making a manifold for an automotive heat exchanger, comprising the steps of:

providing a generally planar sheet of deformable material;

forming the planar sheet of material into an elongate, generally cylindrical member having a seam along the longitudinal length thereof;

forming a plurality of tube receiving slots in the generally cylindrical member by forcing a punch through one side of said member;

inserting an arbor into said cylindrical member so that said arbor contacts said seam;

striking said arbor with said punch through said tube receiving slots and applying pressure perpendicularly against the seam so as to flatten the seam; and welding the seam at a predetermined temperature for a predetermined time.

4. A method according to claim 3, wherein the step of forming the planar sheet of material into an elongate, generally cylindrical member having a seam along the longitudinal length thereof further includes the step of bending the sheet of material into an elongate, generally U-shaped member having an arcuate portion and a pair of flanges extending from the arcuate portion along the longitudinal length thereof, each of the flanges including a longitudinal terminal edge.

5. A method according to claim 4, further including the step of forming a plurality of tube receiving slots in the arcuate portion of said U-shaped member.

6. A method according to claim 5, further including the step of bending the longitudinal terminal edges of the flanges toward each other to form a generally cylindrical member having a seam extending the longitudinal length of the member.

7. A method according to claim 6, further including the step of applying a pressure against the seam so as to force the longitudinal terminal edges toward each other.

* * * * *